United States Patent [19]

Simonton

[11] Patent Number: 4,525,439
[45] Date of Patent: Jun. 25, 1985

[54] CONNECTOR APERTURE SEAL FOR A GALVANIC CELL

[76] Inventor: Robert D. Simonton, 1900 Hampton Rd., Fremont, Ohio 43420

[21] Appl. No.: 540,022

[22] Filed: Oct. 7, 1983

[51] Int. Cl.³ .................. H01M 6/12; H01M 6/46
[52] U.S. Cl. ............................. 429/162; 429/181
[58] Field of Search .......... 429/153, 154, 181, 162, 429/184

[56] References Cited

U.S. PATENT DOCUMENTS

| | | | |
|---|---|---|---|
| 2,144,574 | 1/1939 | MacCallum | 429/153 |
| 2,880,259 | 3/1959 | Nowotny | 429/154 |
| 3,340,099 | 9/1967 | Sherfey | 429/184 |
| 4,060,670 | 11/1977 | Tamminen | 429/162 |
| 4,278,744 | 7/1981 | Athearn | 429/181 |

Primary Examiner—Donald L. Walton
Attorney, Agent, or Firm—David H. Wilson

[57] ABSTRACT

A flat galvanic cell having a plastic envelope surrounding and sealing its active elements is disclosed with a connector extending from a metal plate and piercing the envelope wall. A seal against electrolyte leakage is provided as a subassembly comprising the connector secured to the metal plate which is coated with a resin, a graphite dispersion in polyvinyl chloride, and bonded to the interior face of an envelope wall by an adhesive, a butadiene based elastomeric hot melt adhesive. The subassembly is sealed to the other elements of the envelope at the wall portion margins extending beyond the metal plate.

9 Claims, 4 Drawing Figures

CONNECTOR APERTURE SEAL FOR A GALVANIC CELL

This invention relates to flat galvanic cells and more particularly to such cells having plastic sheet envelopes and the method and means to seal a connector aperture for such cells.

Heretofore it has been known to fabricate flat galvanic cells in which the active elements of the cell are hermetically sealed in an envelope of sheet plastic. In Nowotny U.S. Pat. No. 2,745,894 a cell is shown comprising outer sheets of a non-conductive plastic of chlorinated rubber film bonded together at their peripheries by an adhesive which is coated over at least the periphery of the inner face of each sheet to form a pouch enveloping all of the elements of a primary cell and containing the electolyte of the cell. The cell elements comprise an electrode in the form of a metal sheet, separated from a cake of depolarizer mix by a suitable electrolyte carrier which may be a sheet of fibulous paper. A sheet of conductive plastic is positioned against the opposite face of the mix cake to serve as the other electrode of the cell and a metallic collector plate is positioned against the opposite face of the conductive plastic. Current flow communication is established from the exterior of the cell to its interior components by means of pointed conductive elements which puncture the non conductive plastic walls to engage the respective electodes or their collector plates. The plastic sheet walls are self sealing in the region pierced by the cell connectors by means of an adhesive coating on the plastic.

Another such cell is disclosed in UK patent application GB No. 2 097 574 A published Nov. 3, 1982 for "Contact Arrangement for a Galvanic Battery", which corresponds to U.S. patent application Ser. No. 368,540, and still another is shown in Tamminen U.S. Pat. No. 4,060,670 for "Alkaline Flat Cell Battery" issued Nov. 29, 1977. Each of these disclosures include a laminated plastic sheet envelope having a layer facing the inside which is chemically inert to the electrolyte and heat sealable, such as polyethylene, and an outer layer which is mechanically strong and substantially impervious to oxygen gas such as a polyamide. This laminated plastic sheet is adapted to prevent the escape of water vapor from the cell and the penetration of oxygen into the cell while it has a hydrogen transmission rate sufficient to prevent the formation of hydrogen pressure inside the cell. Within the cell envelope there is provided a negative electrode and a positive electrode with a suitable separator between the electrodes and electroyte distributed throughout the envelope. Current collector plates are disclosed.

In U.S. Pat. No. 4,060,670 an iron current collector, on its side facing the depolarizing mix, is covered with a carbon loaded conductive paint in which the binder material is very resistant to oxygen, suggested to be chlorosulfonated polyethylene. The opposite face of the iron current collector has a layer of insulating adhesive covering a limited area. Connector spring is embedded in the adhesive layer with the purpose of providing either a terminal connection or an intercell connection in an assembly of cells into a battery while avoiding leakage of electrolyte from the cell.

In the published UK patent application a metal plate current collecor is engaged with a connector extending through an aperture in the envelope. An insulation layer of a tough and adhesive material is applied to the outer face of the metal plate so that the connector, when passing through the envelope, first pentrates the insulation layer. This insulation layer is suggested to be a hot melt substance or of bitumen, to which additives similar to rubber have been added.

It has been found that potassium hydroxide solutions employed as electrolytes in arrangement wherein an insulating layer of adhesive is employed between a plastic envelope and a metal positive current collector plate will, with time, penetrate the bond between the plate and the envelope and will leak around the connector aperture. In the form of cell generally disclosed herein, where a flexible pouch has an internal positive collector plate with a connector extending from the plate and pentrating the adjacent pouch wall and an external negative connector penetrating the pouch wall and a negative electrode mass envelope within the pouch, it has been found that the tendency to leak is significantly greater at the positive connector and may be due to an electrochemical reaction or migration. It has been suggested that the tendency be considered an electrochemical capillary action at and around the positive connector to the cell. According to the present invention such leakage is eliminated or significantly retarded to enhance the shelf and operating life of flat cells by applying a coating of a material comprising a thermoplastic resin which resists attack by the electrolyte and forms an effective bond with an adhesive to the interface between metal positive current collector plate surface adjacent the plastic cell envelope and the adhesive bond to that envelope.

An object of this invention is to improve flat galvanic cells.

Another object is to reduce the cost and lengthen the life of alkaline cells of the flat type employing thin walled plastic envelopes.

A further object is to simplify the structure and method of fabrication of the connector aperture seal for flat galvanic cells having thin wall plastic envelopes.

The above and additional objects and features of this invention will be appreciated more fully from the following detailed description when read with reference to the accompanying drawings in which.

Figure 1:
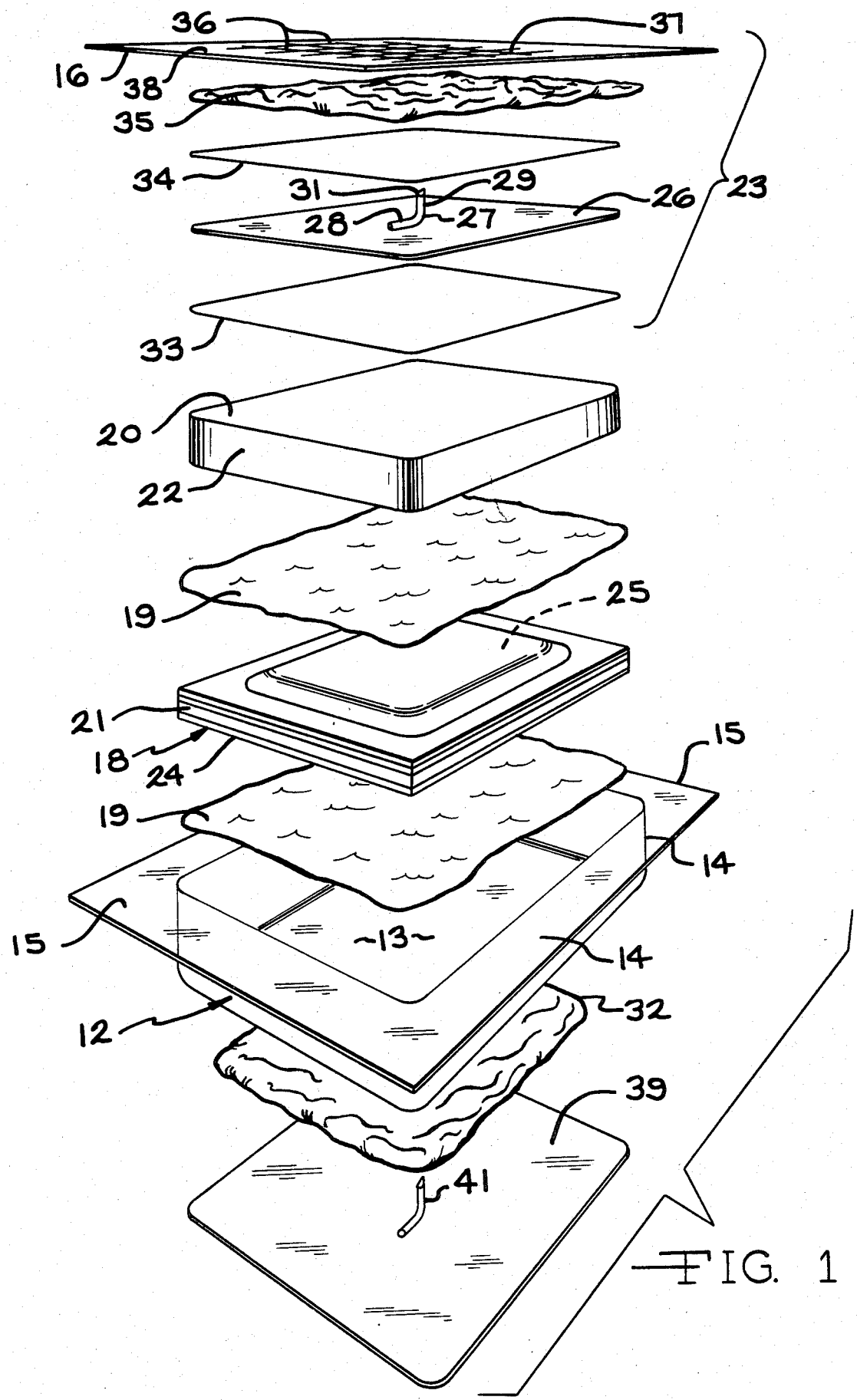
FIG. 1 is an exploded perspective view of a cell according to this invention with the several coatings on the collector plate shown lifted from the plate major faces.

This invention is illustrated in the drawings with the thickness of certain elements exaggerated. Accordingly it is to be appreciated that the drawings are not to scale.

Figure 3:
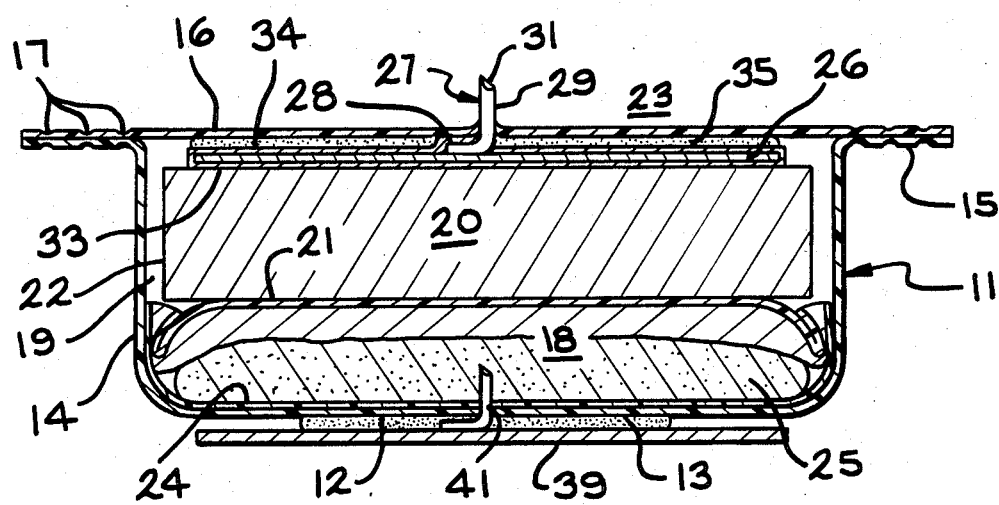
FIG. 3 is a sectional side elevational view of a flat cell having a connector aperture seal according to this invention.
Figure 4:
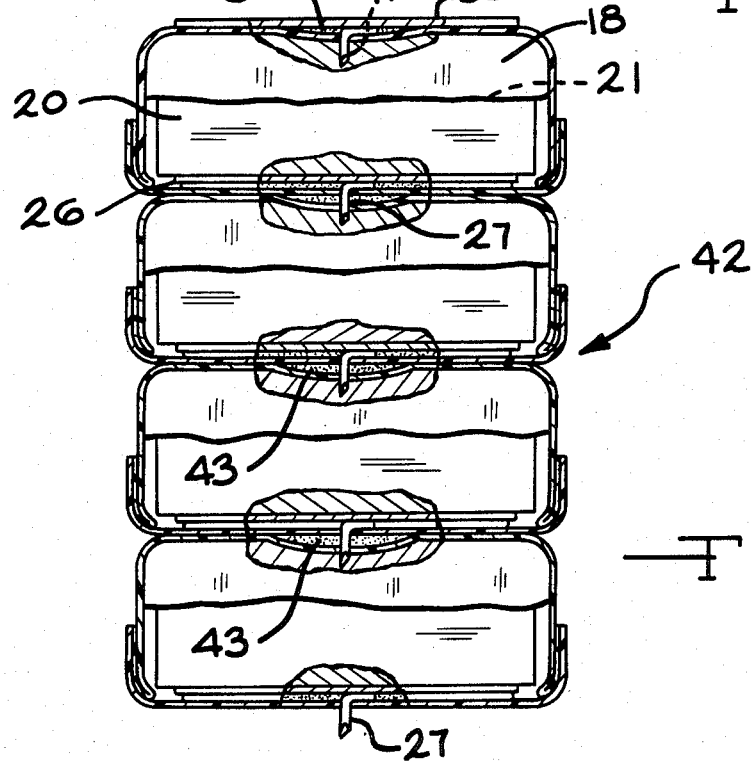
FIG. 4 is a sectional side elevational view of a stack of cells of the type shown in FIG. 3 arranged for incorporation in a conventional battery casing and connected in series relationship.

The cell shown in FIGS. 1 and 3 comprises an envelope 11 made up of sheet plastic which can be laminated as an outer layer of nylon or polypropylene and an inner layer of a modified polyethylene (the laminae of which are not shown). A cup portion 12 of such sheet plastic is advantageously thermoformed as a container for the element of the cell having a flat bottom 13, sidewalls 14 normal to the bottom and outwardly turned peripheral flange 15 at its upper lip which can be in a plane parallel to the plane of bottom 13. An envelope cover 16 of the laminate is sealed to the peripheral flange 15 at parallel weld lines 17 which close on themselves to provide a hermetic seal of the top to the cup. Such a weld or bond can be made ultrasonically, thermally, adhesively, or by a solvent developed fusion. An advantageous envelope construction is a cup 12 formed from a laminate of an inner lamina of five mils of ethylene vinyl acetate and an outer lamina of two mils of nylon and a cover 16 of an inner lamina of three mils of ethylene vinyl acetate and an outer lamina of two mils of nylon. In a final assembly the flanges can be folded along the sidewalls 14 as shown in FIG. 4 to fit within a case (not shown) downward along it respective sidewalls where several cells are stacked in vertical alignment to form a multicell battery.

A negative electrode-separator assembly 18 is located in the bottom of cup 12 and is immersed in electrolyte 19 which flows around and penetrates the assembly. A positive electrode cake 20 is mounted against the separator wall 21 of assembly 18 and is immersed in electrolyte lying between the cake sides 22 and sidewalls 14 of the cup to essentially fill the cup. Collector plate-cover subassembly 23 covers the cake 20 and advantageously is vacuum sealed to the flange 15 of cup 12 typically at a sealing temperature of 265° to 300° F. in the exemplary combination of materials to be discussed.

Negative electrode-separator assembly 18 comprises a pouch like package having a lower wall 24 as viewed in FIGS. 1 and 3 of polyethylene sheet in which is pocketed a negative mass gel mixture 25 which can be a putty like mixture of zinc powder, mercury, and an electrolyte-gelling agent including potassium hydroxide, zinc oxide in solution, carboxymethylcellulose and deionzed water. The upper wall of the pouch, the separator 21 can be a plurality of layers of a material inert to the negative electrode gel mixture 25 and electrolyte 19 and the depolarizer of the positive electrode 20, capable of containing the negative electode gel mixture 25 through the manufacturing process and cell life and having adequate thickness and absorbancy for the maintenance of electolyte between the electrodes to sustain electrolyte in the region. Such characteristics are offered by polyproplyene and blends of rayon and polypropylene felted fibers in sheet form.

Electrolyte 19 can be 29% by weight of potassium hydroxide 3% by weight zinc oxide and deionized water which is introduced into cup 12 in a measured amount depending upon the size of the cell.

Positive electrode 20 is a mixture of about 72.7% by weight manganese dioxide, 16.0% by weight graphite; 8.3% by weight potassium hydroxide solution and 3.0% by weight of powdered Teflon, polytetraflouroethylene.

A collector plate 26 is mounted in electrical communication with the positive electrode 20 as an element of the collector plate-cover subassembly 23. It can comprise a flat, mild steel plate. A connector 27 in the form of a pin is formed of brass wire having an L shape wherein the foot 28 of the L is abutting plate 26 and conductively bonded thereto as by welding. The upstanding body 29 of the L functions in a serially connected battery assembly of cells as an intercell connector and for that purpose has a sharpened end 31 adapted to pierce the bottom 13 of the next adjacent cell casing 11 in the battery cell stack. The intercell connector body 29 is of sufficient length to extend beyond the pouch cover 16 a distance adequate to pass through a seal mass, which may be a quantity of hot melt 32 on the outer face of the bottom 13 of the next adjacent cell casing, the bottom 13, the lower wall 24 of the negative electrode-separator assembly 18 of that cell and into the negative electrode-gel mixture 25 to provide a connector between the positive electrode of the cell and the negative electrode of the next adjacent cell. In order to enhance the electical characterisitcs of the cell, the collector plate is coated on its face abutting the positive electrode cake 20 with a conductive coating 33 which can be formed from a dispersion of finely divided graphite in a thermoplastic resin of a type that dries to a flexible layer. Typically layer 33 can be Electrodag ® 109 supplied by Acheson Colloids Company, Port Huron, Mich. 48060, characterized as a fast drying conductive graphite coating employing a polyvinyl chloride resin binder diluted with lacquer thinner and offering a sheet resistance of less than 30 ohms/square cm. at 1 mil thickness.

A superior barrier to the passage of electrolyte into and through the region between positive current collector plate 26 and cover 16 is provided by applying a coating 34 to plate 26 on its surface adjacent cover 16. Coating 34 is of a material which is adherent to the metal of the plate, is bondable with an adhesive which bonds to the inner face material of cover 16 and is resistant to attack by the cell electrolyte, potassium hydroxide in the example. Hot melt is distributed over coating 34 in a layer 35 to bond cover 16 to collector plate 26. To further enhance the barrier seal to the electrolyte contained in the cell 11, coating 34 and a mass of hot melt is also applied over the connector foot 28.

Figure 2:
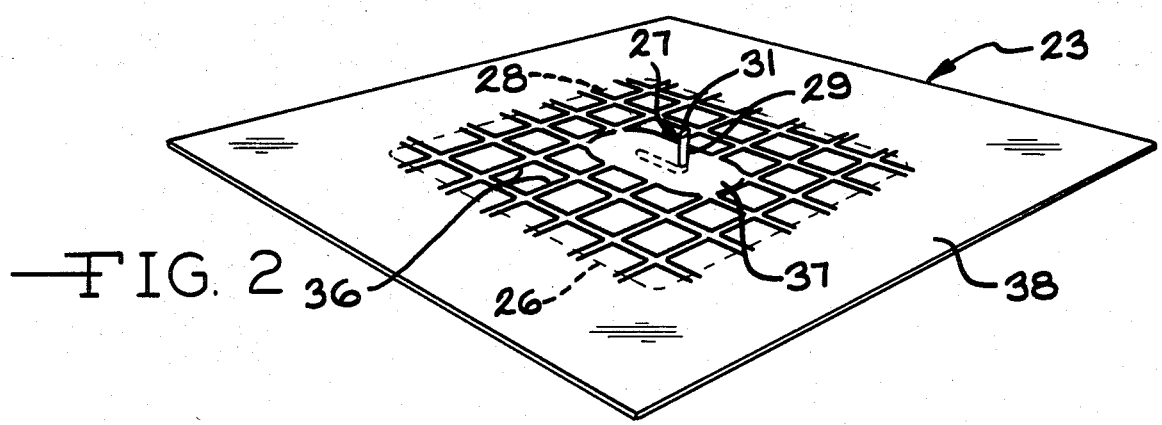
FIG. 2 is a perspective of a cell cover-collector plate subassembly of the cell having a wire cell connector pin secured to the plate.

Plate 26 is prepared to receive coating 34 by being degreased and abraded. Coating 34, which can be of the same material as coating 33, is applied by spraying or dipping, advantageously in the same process as employed to apply coating 33. A charge of hot melt, such as hot melt HM 8346 supplied by H.B. Fuller Co., Assembly Products Division, 5220 Main St. N.E., Minneapolis, Minn. 55421, characterized as a butadiene based elastomeric hot melt adhesive, is applied to the modified polyethylene lamina of the laminated cover 16 and the coated collector plate face having connector 27 extending therefrom is advanced into contact with the molten hot melt 35. In order to minimize the entrapment of gas between the cover 16 and plate 26 a heated platen (not shown) having a flat face and a cavity in registry with the connector to accomodate the connector carries the cover 16 toward and into a compressed relationship to plate 26 whereby the pointed tip of connector pierces the cover and the hot melt is spread over the interfacial areas of the cover and plate by extrusion of the mass. Gas escape passages are provided by a grid of grooves in the face of the platen which cause the external face of cover 16 to be formed with a grid of raised ridges 36 as best seen in FIG. 2. A pocket 37 in the platen and the cover 16 contains the foot 28 of the connector around the body of connector to avoid rupturing the cover in that region. This results in a unitary collector plate-cover subassembly 23 having an intimate bond of the coating 34 and hot melt 35 over essentially the entire interfacial area between cover 16 and collector plate 26. The connector passes through the cover in the center portion of the interfacial area, thereby maximizing the length of all bonds laterally of the area and thus the length of leakage paths for electrolyte within the cell.

The hot melt bonds abutting faces of the coated collector plate 26 and the cover 16 as well as the coated foot of connector 27.

Assembly of the cell is completed by a fusion bond between the flange 15 of cup 12 and the cover perimeter portions 38 extending beyond the plate perimeter in the collector plate-cover subassembly 23. Since the cell is intended to conform to and fill an enclosing battery casing its sidewalls are flexible and compliant and the collector plate 26 is of lesser extent than the cell and its enclosing casing interior. For example in a casing and cell having a generally square (with radius corners) dimension of about two and one quarter inches on a side, plate 26 can be a square (with radius corners) of about one and seven eights inches on a side thereby affording flexibility over a perimeter of the plate for a width of about three sixteenths of an inch.

A cell as shown in FIG. 1 can be used individually as a primary source of current by incorporating it in a suitable casing and connecting conductors between the cell anode and cathode and appropriate terminals thereon. The positive terminal is connected by a low resistance fusion bond between a conductor and the connector 27. In order to reduce the height of the encased cell the connector is bent generally parallel to the collector plate major plane. The negative terminal is connected as by means of a conductor fusion bonded to the terminal and to a plate 39 of the general form of plate 26. That negative terminal plate has a connector 41 of the form of connector 27 on its face adjacent the cell to make electrical contact with the negative electrode-gel mass 25 by piercing the cup bottom 13 and the anode-separator assembly lower wall 24. A sealed connection is provided by applying hot melt between the plate and cup bottom 13 in the region surrounding and including the connector 27.

When employed in a multicell battery in which the cells are stacked only the cell at the negative end of the stack is provided with a collector plate 39 and connector pin 41 since the remaining cells in the stack utilize the connector pin 27 on the positive side of the next cell as a cell interconnector. The positive connection to the battery is formed as described above by a fusion bond to the connector pin 27 of the first cell in the stack as viewed from the positive end thereof.

A battery stack 42 is shown in FIG. 4 with four cells in compression to fill a casing more completely and permit a greater volume of active cell elements for high capacity performance, and to enhance the seal at the connectors 27 and 41. It will be noted that the external hot melt mass 32 is applied to the exterior of the cell envelope bottoms 13 immediately preceding the assembly of stack 42. The flexible bottom walls 13 and the electrode-separator subassemblies 13 contained by them are sufficiently compliant and flexible to yield and form a pocket 43 for the adhesive mass between each cell thereby enabling pressure to be imposed across the interface region between cells and the seal of cover 16 on adhesive 35 to coating 34 on metal plate 26. This distributed pressure, particularly at the positive current collector and positive intercell connector further enhances the efficiency of the seal against liquid electrolyte leakage arround the connectors.

What is claimed is:

1. An element of a flat alkaline cell comprising a plastic sheet for a cell envelope wall, a metal collector plate having its major surfaces coextensive with the flat dimensions of said cell, a metallic connector, a fused metallic bond between said plate and said connector on a central portion of a first major surface of said plate, a coating of a material which is adherent to the metal of said plate and is resistant to attack by potassium hydroxide on said first major surface of said plate coextensive with said first major surface, and a layer of hot melt adhesive on said coating, coextensive with and bonded to said coating on said first major surface of said plate over essentially the entire surface surrounding said connector bond, and bonded to said plastic sheet over an area essentially coextensive and in registry with said first major surface of said plate, said sheet having a passage for said connector and said connector passing through said sheet at the central portion of said plate whereby essentially the entire lateral extent of said coating and adhesive on said plate seals against the flow of potassium hydroxide to be contained within the cell to said passage in said envelope sheet.

2. A combination according to claim 1 wherein said coating is a resin.

3. A combination according to claim 2 wherein said resin coating comprises polyvinyl chloride.

4. A combination according to claim 1 wherein said adhesive is a butadiene based elastomeric hot melt.

5. A combination according to claim 3 wherein said adhesive is a butadiene based elastomeric hot melt.

6. A combination according to claim 1 wherein coating is a polyvinyl chloride resin containing a dispension of finely divided graphite, said adhesive is a butadiene based elastomeric hot melt, and said plastic sheet material of said envelope proximate the major face of said plate is ethylenevinylacetate.

7. A combination according to claim 1 wherein said plate major face most proximate said plastic sheet material of said envelope is burnished and degreased prior to the application thereto of said coating.

8. A combination according to claim 1 wherein said plastic sheet material of said envelope proximate the major face of said plate is modified polyethylene.

9. A combination according to claim 1 wherein said coating is a polyvinyl chloride resin containing a dispersion of finely divided graphite.

* * * * *

Adverse Decision in Interference

In Interference No. 102,187, involving Patent No. 4,525,439, R. D. Simonton, CONNECTOR APERATURE SEAL FOR A GALVANIC CELL, final judgment adverse to the patentee was rendered May 4, 1990, as to claims 1-9.

*[Official Gazette August 28, 1990]*